April 3, 1962 D. P. ECKMAN 3,028,175
AUTOMATICALLY LEVELING VEHICLE SUSPENSION SYSTEM
Filed June 15, 1959 3 Sheets-Sheet 1
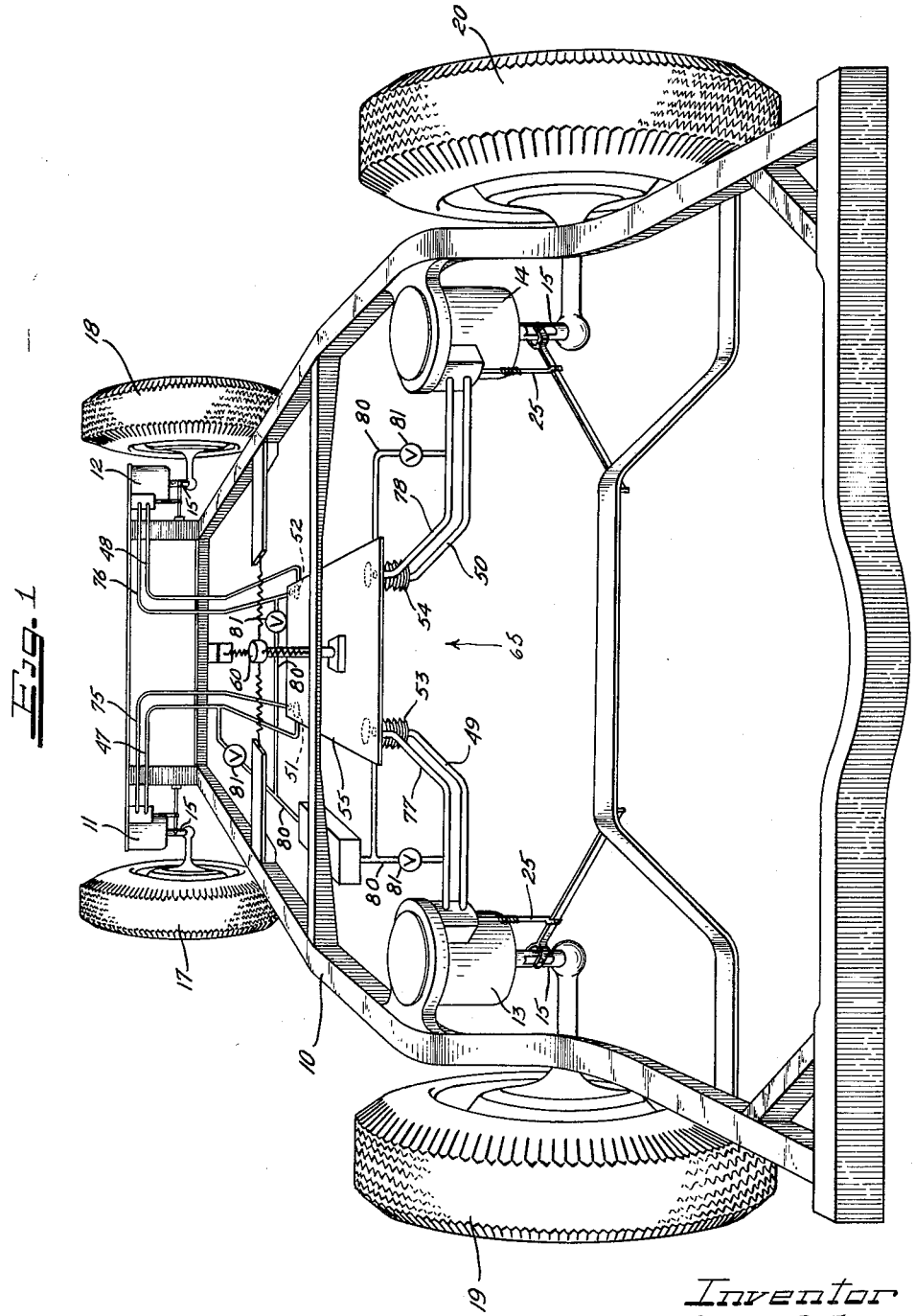
Inventor
DONALD P. ECKMAN

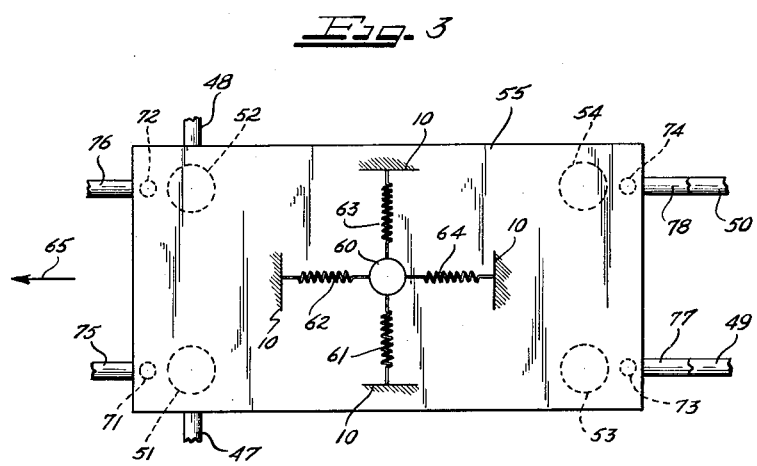
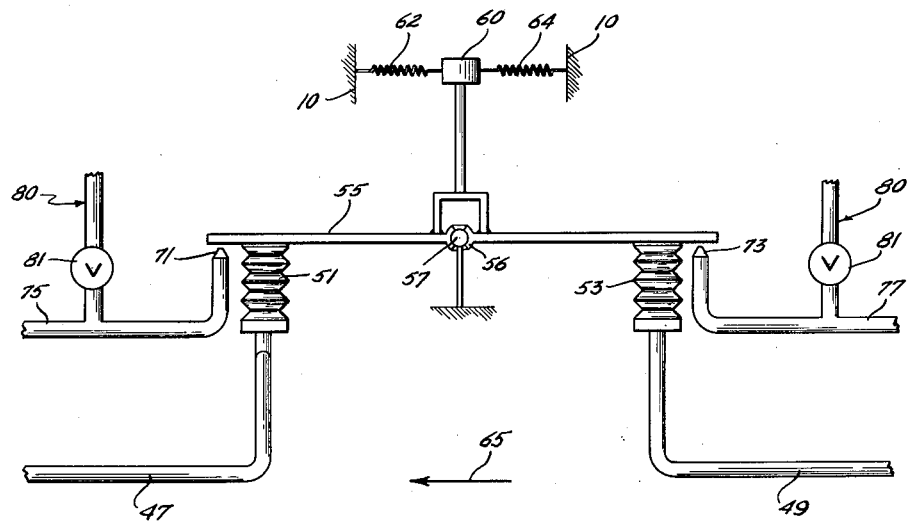

April 3, 1962     D. P. ECKMAN     3,028,175

AUTOMATICALLY LEVELING VEHICLE SUSPENSION SYSTEM

Filed June 15, 1959     3 Sheets-Sheet 3

Inventor
DONALD P. ECKMAN

United States Patent Office 3,028,175  
Patented Apr. 3, 1962

3,028,175  
AUTOMATICALLY LEVELING VEHICLE SUSPENSION SYSTEM  
Donald P. Eckman, Cleveland Heights, Ohio, assignor to Thompson Ramo Wooldridge Inc., Cleveland, Ohio, a corporation of Ohio  
Filed June 15, 1959, Ser. No. 820,425  
11 Claims. (Cl. 280—124)

The present invention relates to automotive vehicle suspension systems and is, more particularly, directed to a vehicular suspension providing automatic control of vehicle pitch, roll and leveling in addition to providing conventional spring isolation of the vehicle frame relative to the road surface.

As those skilled in the automotive field are aware, it is extremely desirable that variations in the road surface not affect the general stability of the vehicle. Further, it is also desired that forces applied to the vehicle during high speed turns and braking, such as for example, vehicle roll, and vehicle pitching, respectively, be counteracted to provide an essentially level vehicle ride. Further, it is desired that the body of an automotive vehicle remain at approximately the same road height independently of the weight applied to the body in the form of passengers or other vehicular load. To my knowledge, while those working in the field are aware of the desirability of the above-mentioned factors affecting vehicle operation, nevertheless no truly successful vehicle suspension has been achieved prior to the present invention and which will satisfactorily accomplish all of the above-mentioned desired ends.

In accordance with the present invention, a completely automatic vehicle suspension is provided wherein the vehicle is maintained in a substantially level condition at all times, including those periods in which the vehicle is traveling along a crowned road surface, is negotiating turns, or is operating with various vehicular load conditions. In accordance with the principles of the present invention, a four-wheeled vehicle is provided with an independent suspension unit at each wheel for supporting that wheel relative to the vehicle frame. Each of the suspension units is an active suspension strut preferably of the hydropneumatic or pneumatic type in which the weight of the vehicle is carried, respectively, on a column of liquid acting against a resilient cushion of air or directly on the cushion of air. The actual pneumatic or hydropneumatic pressure within each strut is sensed to provide a signal corresponding to the load on that individual spring member. This signal is employed for controlling that strut, as well as each of the remaining three struts, to provide an essentially level vehicle.

In further accordance with the invention an independently movable mass is mounted to accept acceleration forces applied to the vehicle in a generally horizontal plane from any direction and to likewise reflect the position of the vehicle body relative to the gravitational axis. This mass, which for convenience may be termed a control mass, is mounted to deflect a control plate which integrates not only the acceleration forces resulting from turns, gravity and braking effects, but also the general position of the four separate wheel suspension units. This control information is, through valving of the present invention, correlated to provide an automatically maintained level vehicle condition.

It is, accordingly, an object of the present invention to provide an improved automatic vehicle suspension.

Another object of the present invention is to provide an automotive suspension system employing a plurality of power-operated support struts controlled in response to external forces applied to the vehicle to provide an essentially level vehicle body condition at all times.

Yet another object of the present invention is to provide an improved automotive suspension system capable of accurate regulation of the amount of roll and pitch resulting in the vehicle frame as a result of braking and turning forces.

Still a further object of the present invention is to provide a simple control means for operating a vehicular automatic leveling suspension in response to forces applied to the vehicle, including the forces of gravity.

Still another object of the present invention is to provide a completely automatic automotive vehicle leveling suspension system requiring no mechanical roll bar or anti-sway bar commonly employed in present day systems.

A feature of the invention resides in the provision of a spring centered control mass mounted for movement in response to vehicle acceleration and deceleration as well as to gravitational forces.

A further feature of the invention is the provision of novel control valving for maintaining the level of a vehicular automotive suspension system substantially constant.

Still other and further objects of the present invention will at once become apparent to those skilled in the field of automotive suspensions from a consideration of the attached specification and drawings wherein a preferred form of the invention is shown by way of illustration only, and wherein:

FIGURE 1 is a diagrammatic illustration of a vehicle suspension system employing four independently suspended vehicle load-carrying wheels, as viewed from the rear;

FIGURE 2 is a side-elevation of a control mass and control valve plate employed in accordance with the principles of the present invention;

FIGURE 3 is a view of the apparatus shown in FIGURE 2, in plan view; and

As shown on the drawings:

Figure 4:
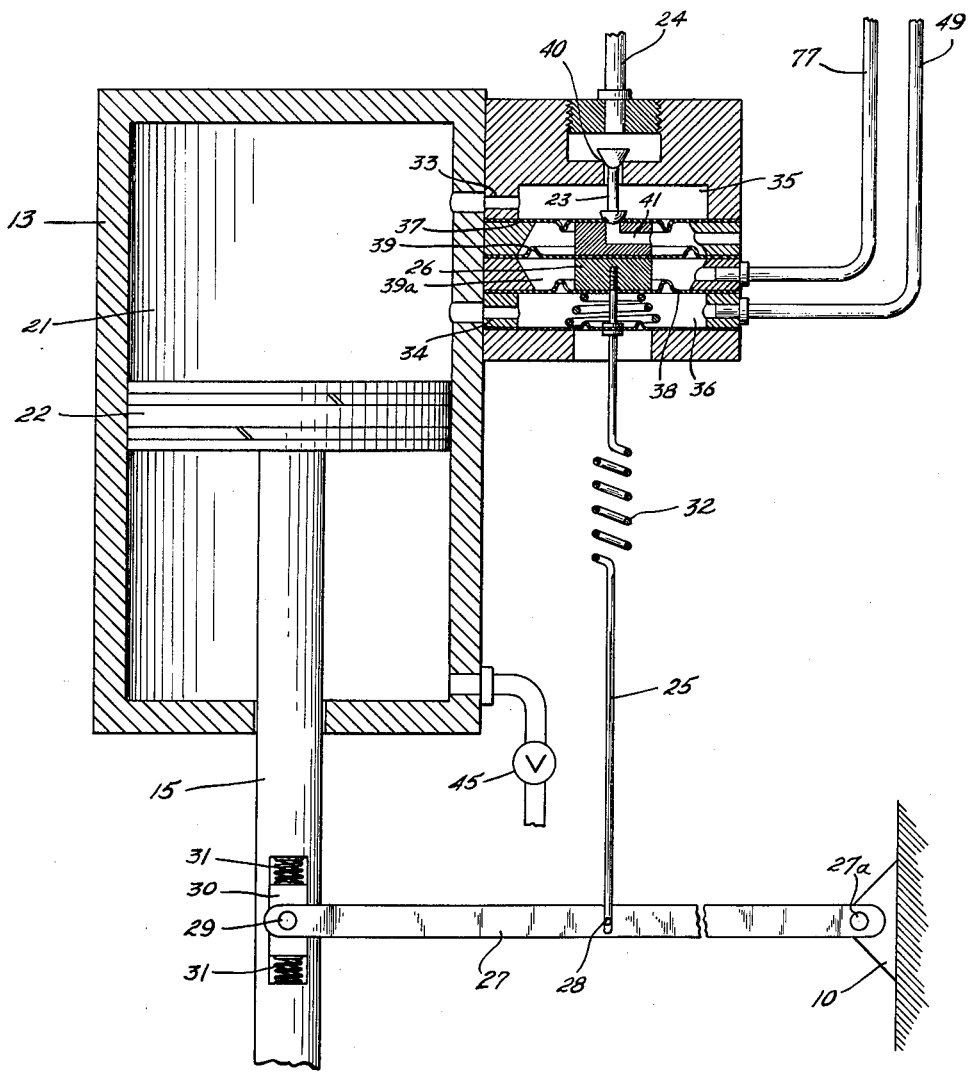
FIGURE 4 is an elevational view in cross-section diagrammatically illustrating the individual wheel-supporting strut members.

As may be seen from a consideration of FIGURE 1, a conventional automotive vehicle there diagrammatically illustrated is provided with a frame 10 rigidly interconnecting four power-operated vehicle supporting struts 11, 12, 13 and 14. In the form of the invention shown it is contemplated that the vehicle be supported directly on a column of air rather than hydropneumatically. Accordingly, each of the struts 11, 12, 13 and 14 is a pneumatic automatic vehicle strut, although it will be observed that the hydropneumatic strut may be employed equally as well.

As shown in FIGURE 4, for example, a pneumatic suspension strut is employed. This strut comprises a housing 13 rigidly secured to the vehicle frame 10 by any convenient means, and a piston rod 15 secured to a respective vehicle wheel 17. In the arrangement in which four individual suspension struts are employed, one at each vehicle wheel, the weight of the vehicle over the individual wheel will be carried by the compressed air in chamber 21 defined by the cylinder 13 and the piston head 22. The pneumatic pressure in the chamber 21 is controlled by means of a valve 23 controlling the flow from conduit 24 leading to a source of pneumatic fluid under a substantially higher pressure than the pressure in chamber 21.

The valve 23 is controlled in response to several functions. In the first place, a spring link 25 is provided between a valve core 26 and the vehicle wheel 17. The link 25 is secured to the wheel-carrying piston rod 15 by way of a sensing link 27 pivoted to the frame 10 at 27a, to the link 25 at 28, and to the connecting rod 15 at 29. The connection between the pivot 29 and the connecting rod 15 comprises a simple form of accelerometer in which a mass 30 is reciprocably slidable relative to the piston rod 15 and is centered by relatively light springs 31. As a result of this connection, high frequency vibrations of the piston rod 15 affected by slight road irregularities are isolated from the sensing link 27 by the springs 31 and only major deflections of the piston rod 15 are reflected in actual movements of the link 25. The link 25 is additionally provided with a resilient spring 32 to provide further isolation of the valve core 26 from the high frequency oscillations of the reciprocating connecting rod 15. This attenuation of high frequency vibration is additionally aided by damping of the valve core 26 occurring as a result of restricted orifices 33 and 34 connecting chambers 35 and 36 with chamber 21. As shown, the valve core 26 is provided with flexible diaphragms 37 and 38 sealing the respective chambers 35 and 36 and accordingly movement of the core 26 is damped by restricted air flow. However, it will be observed that any form of dashpot damping means may be employed in connection with the core 26 to prevent rapid accelerations from operating the core 26 and thereby further attenuate high frequency vibration of the core 26 in response to high frequency vibrations of the individual vehicle wheels.

As above indicated, the valve 23 is opened and closed by the position of the valve core 26. When the valve 23 is moved downwardly as viewed in FIGURE 4, it seats on its port 40 closing off the ingress of fluid under pressure via conduit 24. The pressure of the fluid in conduit 24 operates to maintain the valve 23 seated and, accordingly, in closed condition, at all times unless urged into an unseated condition as will now be described.

The valve core 26 is supported by the flexible diaphragms 37, 38 and 39 for vertical movement. In the normal position of operation in which the vehicle is at rest and is maintained at its desired suspension level by the pressure in chamber 21, the valve core 26 will be in contact with the valve 23 thereby closing off exhaust port 41 leading to atmosphere. At the same time, the valve 23 will be in the closed condition relative to port 40 so that fluid under pressure neither enters the chamber 21 via conduit 24 nor leaves chamber 21 via exhaust port 41. Under these conditions the suspension is essentially stable with the pneumatic pressure in chamber 21 being substantially constant.

In the event that the pressure in chamber 21 decreases as a result of a lightening of the vehicle load, the vehicle frame will move upwardly relative to the piston 22 and the link 25 will, accordingly, move the valve core 26 downwardly through the spring 32 to vent the chamber 21 via open port 41. As soon as the vehicle has lowered to the desired level condition the piston rod 15 will have moved upwardly relative to the casing 13 sufficiently to cause return of the valve 26 to its position in contact with the lower end of the valve 23. On the other hand, if the load is increased on the vehicle frame 10, the piston 22 will move upwardly relative to the chamber 13 moving with it the valve core 26 via spring link 25. This upward movement will cause the valve 23 to unseat from the port 40 permitting the introduction of additional fluid under a pressure higher than the pressure in chamber 21, to thereby expand the chamber to re-position the vehicle body in its desired condition.

As illustrated in FIGURE 4, the piston and cylinder suspension strut 13 is a pneumatic spring. Damping for this spring may be provided by means of a restricted by-pass from the area beneath the piston 22 to the chamber 21. Alternatively, and in the arrangement specifically illustrated, a restricted orifice 45 venting the chamber beneath piston 22 to atmosphere provides a shock absorbing or damping action to control wheel rebound in rough road conditions.

As thus far described above, the individual wheel struts 13, 15 provide an independent suspension for each of the vehicle wheels. Such an arrangement provides a vehicle suspension in which all of the vehicle wheels act independently. Such conditions as vehicle pitch (oscillation about a transverse horizontal axis) and vehicle roll (oscillation about a longitudinal horizontal axis) are in no way prevented or controlled in a system as thus far described.

In accordance with the principles of the present invention, however, a centralized control is provided for the vehicle suspension whereby the pitch and roll of the vehicle are readily controlled. As shown, this interconnection is provided in the form of a load signal taken from each of the suspension chambers of the individual struts 11, 12, 13 and 14 via respective conduits 47, 48, 49 and 50. These conduits are, in turn, respectively connected to load reflecting expansible bellows 51, 52, 53 and 54 acting at the four corners of a solid deflection plate 55 centrally pivoted by socket 56 on ball stud 57 carried by the frame 10. Preferably the stud 57 is carried generally centrally of the vehicle to minimize the effect thereon of any deflections of the vehicle frame caused by the application of loads or other forces at only one corner thereof.

As a result of the above central deflection plate arrangement, it will be clear that when the load-reflecting pressures in chambers 51, 52, 53 and 54 are equal, the plate 55 will be level relative to the vehicle frame 10, which condition is the desired condition of vehicle operation. However, should the load at any one or more wheels increase without a corresponding increase at the remaining wheels, provision is made to re-level the vehicle frame. This is accomplished by sensing the position of the deflection plate 55 and controlling the individual wheel struts 11, 12, 13 and 14 in accordance with the sensed position of the plate 55. In the present invention this comprises means causing movements of the deflection plate 55 in general conformity with the forces acting upon the vehicle body itself. This is accomplished through the provision of a mass 60 rigidly secured to the deflection plate 55 above the center of gravity thereof and balanced by four centering springs 61, 62, 63 and 64 secured at their outboard ends to the vehicle frame 10, preferably in an adjustable manner.

If it is assumed that the direction of ordinary vehicular motion is in the direction of the arrow 65, decelerations occurring as a result of braking forces or the like will cause counterclockwise oscillation of the mass 60 about the stud 57 as viewed in FIGURE 2 in the same manner as pitch affects the vehicle body. Likewise, when the vehicle moving in the direction of arrow 65 makes a left turn, the centrifugal force of the turn applied to, and the momentum of, the mass 60 will cause movement generally toward the spring 63 reflecting a vehicle roll condition. Further, if the vehicle is not level, such as when traversing a hill, the center of the mass 60 will be transversely displaced relative to the center of the supporting stud 57 with a resulting deflection of the plate 55 reflecting in general the force of gravity on the vehicle. These forces acting against the vehicle wheel loads at 51, 52, 53 and 54 operate to deflect the deflection plate 55. These deflections of the plate 55 are sensed and transmitted to the individual wheel suspension struts by means of respective control nozzles 71, 72, 73 and 74.

As shown in FIGURE 1 and in FIGURE 2, the respective control nozzles 71, 72, 73 and 74 are connected to a respective leveling signal conduit 75, 76, 77 and 78 connected to the individual wheel struts in the manner illustrated in FIGURE 4. Each of the conduits 75, 76, 77 and 78 is supplied at a point intermediate its nozzle and suspension strut, from a common source 80 of fluid under pressure. Preferably, the source 80 is the same source supplying the conduit 24 applying fluid under pressure to the individual leveling strut. The supply of fluid under pressure provided at 80 is applied to the respective conduits 75, 76, 77 and 78 at an adjusted pressure controlled by adjustable valves 81.

In a normal vehicle condition in which the vehicle is resting on a level surface with the load on the independent wheel struts equalized, the plate 55 will be positioned in spaced relation relative to the nozzles 71, 72, 73 and 74. The spacing between the plate and the respective nozzle will be identical in all cases and a continuous flow of fluid under pressure into the signal level conduits from the source 80 will pass out through the nozzles 71, 72, 73 and 74 at a rate restricted by the plate 55 covering the nozzles. Since the plate will cover all of the nozzles to the same extent under the normal situation above mentioned, the signal pressure applied to each of the individual wheel suspension struts will be identical. In the specific arrangement illustrated in the drawings, the leveling signal is applied to chamber 39a and acts against diaphragms 38 and 39. In the arrangement shown, the area of diaphragm 39 is greater than the effective area of diaphragm 38 and, accordingly, a positive pressure in the conduit 75 will cause a bias against the valve core 26 in the upward direction tending to maintain the venting port 41 closed. An increase in the leveling signalling pressure will further bias the valve core 26 upwardly to cause the introduction of additional fluid under pressure to extend the strut 13, 15 to raise the vehicle frame relative to the wheel.

Variations in the pressure in the conduits 75, 76, 77 and 78 are occasioned as a result of movements of the plate 55. For example, in a vehicle pitch situation in which the brakes are applied and the vehicle is decelerated rapidly, the momentum of the mass 60 will tend to move against spring 62, stretching spring 64 and deflecting the plate 55 in a counterclockwise direction around the stud 57 as viewed in FIGURE 2. This will cause the plate 55 to move against the load bellows 51 and 52 to further close the nozzles 71 and 72 thereby increasing the pressure in respective leveling signalling conduits 75 and 76. This increased pressure will, as above mentioned, cause the addition of fluid under pressure to the struts 11 and 12 thereby lifting the front of the vehicle against the decelerating forces to prevent dipping of the vehicle under the conditions ordinarily causing a very substantial dip. Likewise, in the roll situation, centrifugal force acting against the mass 60 in a left turn will cause movement of the mass against spring 63 stretching spring 61 and restricting the nozzles 72 and 74 to elevate the vehicle body on the outboard side of the turn. It will be observed that in both the pitch and roll situations above mentioned, in which certain of the signal nozzles are further restricted, the remaining signal nozzles will be less restricted with the result that the suspension struts located at the points of lessening load as a result of the pitch or roll condition will be shortened. By controlling the value of the control pressure in the conduits 75, 76, 77 and 78 by way of the valves 81, and by controlling the value of the pressure supplied to the struts relative to the ordinary normal pressure therein, the rapidity of strut extension and contraction under the pitch and roll conditions may readily be adjusted. Obviously, under these circumstances, a vehicle subjected to pitching forces may actually be provided with sufficient lifting action at the front of the vehicle to cause the vehicle to lift rather than dive under pitch conditions. Likewise, in roll conditions the outboard side of the vehicle may actually be lifted rather than assuming its usual dip.

In addition to the elimination of dive and dip movements of the vehicle body, the deflection plate 55 operating as it does against the load bellows 51, 52, 53 and 54, provides a control of the individual struts to compensate for unequal loading of the vehicle. For example, if the left rear wheel strut 13 is very heavily loaded relative to the remainder of the vehicle struts, by a load centered immediately thereover, the pressure in the bellows 53 will be greater than the pressure in the remaining bellows and will cause a lifting of the plate 55 over the bellows 53 and a depression of the plate immediately over the bellows 52. The transfer of vehicle weight, taking the form of increased pressure in the bellows to which the increased weight is applied, such as for example in pitch and/or roll conditions, will cause the plate to move upwardly relative to the respective control nozzle thereby providing a feed-back to level the plate 55 in a steady state condition of unequal weight distribution.

It will, of course, be apparent that in situations in which the vehicle is traveling on a non-level surface, such as for example in driving uphill, downhill or on the side of a cambered road, the vehicle body will be tilted out of the horizontal plane and the mass 60 will be gravitationally urged downwardly along a line passing eccentric of the center stud 57. This force will tend to deflect the plate downwardly toward the low side of the vehicle body thereby causing an increase in pressure at the respective signal control nozzle and, accordingly, an increase in the pressure of the respective suspension struts on the low side of the vehicle. Such increase will cause the vehicle to raise slightly on the low side and lower slightly on the high side to provide an essentially level ride.

It will, accordingly, be apparent to those skilled in the art that I have provided a novel automotive suspension employing individual wheel suspension struts capable of maintaining the vehicle in a level condition and integrated with each other to control the amount of pitch and roll of the vehicle in response to external forces tending to produce them. It is, of course, understood that variations may be made in the structures above described without departing from the scope of the novel concepts of the present invention. For example, it will be understood that while the specific embodiment illustrated comprises a completely pneumatic suspension system, the system may equally as well comprise a hydropneumatic system in which the chamber 21 is filled with incompressible liquid in communication with a separate pneumatic spring. In such an arrangement it is envisaged that the source of fluid under pressure for conduit 24 as well as the leveling signal conduits comprise a source of liquid under pressure. Further variations may also, of course, be made without departing from the inventive concepts hereinabove set forth. It is, accordingly, my intention that the scope of the invention be limited solely by that of the hereinafter appended claims.

I claim as my invention:

1. In combination in a road vehicle having four generally vertically disposed fluid controlled active suspension struts individually spaced apart longitudinally and transversely of the vehicle for supporting the frame of said vehicle relative to the four wheels thereof, valve means selectively introducing fluid under pressure to each of said struts to expand said strut or venting said strut to atmosphere to contract said strut, first actuating means for actuating said valve means to introduce fluid into a respective strut to expand said strut in response to the respective positions of said vehicle frame and vehicle wheel to maintain the respective wheel at a desired elevation relative to the frame, second actuating means for actuating said valve means in response to external forces applied to said frame and comprising a single mass mounted for universal pivotal movement relative to the vehicle about a point vertically spaced from said mass and resiliently biased into a centered position in which said valve means is unaffected by said second actuating means but from which the mass is deflected by forces of acceleration applied to said vehicle frame to actuate said valve means, said actuation being at a rate increasing progressively as the mass moves progressively further from centered position in response to said external force to expand the strut on the side of the vehicle frame positioned relative to said mass in the same direction as said mass is deflected.

2. In combination in a road vehicle having four generally vertically disposed fluid controlled active suspension struts individually spaced apart longitudinally and transversely of the vehicle for supporting the frame of said vehicle relative to the four wheels thereof, valve means selectively introducing fluid under pressure to each of said struts to expand said strut or venting said strut to atmosphere to contract said strut, first actuating means for actuating said valve means to introduce fluid into a respective strut to expand said strut in response to the respective positions of said vehicle frame and vehicle wheel to maintain the respective wheel at a desired elevation relative to the frame, second actuating means for actuating said valve means in response to external forces applied to said frame and comprising a single mass universally pivotally mounted on said vehicle frame generally centrally thereof and having its center of gravity generally vertically spaced above said pivot, said mass being biased into a centered position in which said valve means is unaffected by said second actuating means but from which said mass is deflected by forces of acceleration applied to said vehicle frame to thereby actuate the valve means to expand the strut positioned on the side of the vehicle frame relative to said pivot in the direction of movement of said mass, actuation of said valve means being at a rate increasing progressively as the mass moves progressively further from centered position in response to variation in said external force.

3. In combination in a road vehicle having four generally vertically disposed fluid controlled active suspension struts individually spaced apart longitudinally and transversely of the vehicle for supporting the frame of said vehicle relative to the four wheels thereof, valve means selectively introducing fluid under pressure to each of said struts to expand said strut or venting said strut to atmosphere to contract said strut, first actuating means for actuating said valve means to introduce fluid into a respective strut to expand said strut in response to the respective positions of said vehicle frame and vehicle wheel to maintain the respective wheel at a desired elevation relative to the frame, second actuating means for actuating said valve means in response to external forces applied to said frame and comprising a single mass mounted centrally of the vehicle for universal pivotal movement relative to the vehicle about a pivot vertically spaced from said mass and resiliently biased into a centered position in which said valve means is unaffected by said second actuating means but from which the mass is deflected by forces of acceleration applied to said vehicle frame to actuate said valve means to expand the strut on the side of the vehicle frame positioned relative to said mass in the same direction as said mass is deflected, said mass being mounted on a deflection plate for universal movement thereof with said mass, separate fluid pressure means for actuating said valve means, and means associated with the four diagonal corners of said plate controlling the pressure of said fluid pressure means in response to movement of said plate.

4. In combination in a road vehicle having four generally vertically disposed fluid controlled active suspension struts individually spaced apart longitudinally and transversely of the vehicle for supporting the frame of said vehicle relative to the four wheels thereof, valve means selectively introducing fluid under pressure to each of said struts to expand said strut or venting said strut to atmosphere to contract said strut, first actuating means for actuating said valve means to introduce fluid into a respective strut to expand said strut in response to the respective positions of said vehicle frame and vehicle wheel to maintain the respective wheel at a desired elevation relative to the frame, second actuating means for actuating said valve means in response to external forces applied to said frame and comprising a mass universally pivotally mounted on said vehicle frame and having its center of gravity generally vertically spaced from said pivot, said mass being biased into a centered position in which said valve means is unaffected by said second actuating means but from which said mass is deflected by forces of acceleration applied to said vehicle frame to thereby actuate the valve means to expand the strut positioned on the side of the vehicle frame relative to said pivot in the direction of movement of said mass, said mass being mounted on a generally horizontally positioned plate pivoted to move universally with said mass, fluid pressure means actuating said valve means, and means operable in response to pivotal movement of said plate to operate said fluid pressure means to control the pressure thereof to control said valve.

5. In combination in a road vehicle having four generally vertically disposed fluid controlled active suspension struts individually spaced apart longitudinally and transversely of the vehicle for supporting the frame of said vehicle relative to the four wheels thereof, valve means selectively introducing fluid under pressure to each of said struts to expand said strut or venting said strut to atmosphere to contract said strut, first actuating means for actuating said valve means to introduce fluid into a respective strut to expand said strut in response to the respective positions of said vehicle frame and vehicle wheel to maintain the respective wheel at a desired elevation relative to the frame, second actuating means for actuating said valve means in response to external forces applied to said frame and comprising a mass universally pivotally mounted on said vehicle frame and having its center of gravity generally vertically spaced from said pivot, said mass being biased into a centered position in which said valve means is unaffected by said second actuating means but from which said mass is deflected by forces of acceleration applied to said vehicle frame to thereby actuate the valve means to expand the strut positioned on the side of the vehicle frame relative to said pivot in the direction of movement of said mass, said mass being mounted on a generally horizontally positioned plate pivoted to move universally with said mass, fluid pressure means actuating said valve means, and means operable in response to pivotal movement of said plate to operate said fluid pressure means to control the pressure thereof to control said valve means, said fluid pressure means comprising a conduit under pressure directing said pressure against the valve means to control each strut, and said fluid pressure means comprising a pressure release vent positioned immediately adjacent said plate and fixed relative to said frame for adjustment by deflection of said plate.

6. In combination in a road vehicle having four generally vertically disposed fluid controlled active suspension struts individually spaced apart longitudinally and transversely of the vehicle for supporting the frame of said vehicle relative to the four wheels thereof, valve means selectively introducing fluid under pressure to each of said struts to expand said strut or venting said strut to atmosphere to contract said strut, first actuating means for actuating said valve means to introduce fluid into a respective strut to expand said strut in response to the respective positions of said vehicle frame and vehicle wheel to maintain the respective wheel at a desired elevation relative to the frame, second actuating means for actuating said valve means in response to external forces applied to said frame and comprising a mass universally pivotally mounted on said vehicle frame and having its center of gravity generally vertically spaced from said pivot, said mass being biased into a centered position in which said valve means is unaffected by said second actuating means but from which said mass is deflected by forces of acceleration applied to said vehicle frame to thereby actuate the valve means to expand the strut positioned on the side of the vehicle frame relative to said pivot in the direction of movement of said mass, said mass being mounted on a generally horizontally positioned plate pivoted to move universally with said mass, fluid pressure means actuating said valve means, and means operable in response to pivotal movement of said plate to operate said fluid pressure means to control the pressure thereof to control said valve means, said fluid pressure means comprising a conduit under pressure directing said pressure against the valve means to control each strut, and said fluid pressure means comprising a pressure release vent positioned immediately adjacent said plate and fixed relative to said frame for adjustment by deflection of said plate, and means responsive to an increase in the pressure of each said strut supporting said frame to urge said mass to return to centered position.

7. In combination in a road vehicle having four generally vertically disposed fluid controlled active suspension struts individually spaced apart longitudinally and transversely of the vehicle for supporting the frame of said vehicle relative to the four wheels thereof, valve means selectively introducing fluid under pressure to each of said struts to expand said strut or venting said strut to atmosphere to contract said strut, first actuating means for actuating said valve means to introduce fluid into a respective strut to expand said strut in response to the respective positions of said vehicle frame and vehicle wheel to maintain the respective wheel at a desired elevation relative to the frame, second actuating means for actuating said valve means in response to external forces applied to said frame and comprising a mass universally pivotally mounted on said vehicle frame and having its center of gravity generally vertically spaced from said pivot, said mass being biased into a centered position in which said valve means is unaffected by said second actuating means but from which said mass is deflected by forces of acceleration applied to said vehicle frame to thereby actuate the valve means to expand the strut positioned on the side of the vehicle frame relative to said pivot in the direction of movement of said mass, said mass being mounted on a generally horizontally positioned plate pivoted to move universally with said mass, fluid pressure means actuating said valve means, and means operable in response to pivotal movement of said plate to operate said fluid pressure means to control the pressure thereof to control said valve means, said fluid pressure means comprising a conduit under pressure directing said pressure against the valve means to control each strut, and said fluid pressure means comprising a pressure release vent positioned immediately adjacent said plate and fixed relative to said frame for adjustment by deflection of said plate, and means responsive to an increase in the pressure of each said strut supporting said frame to urge said mass to return to centered position, said last-named means comprising a fluid motor energized by the fluid underload in each respective strut and acting against said plate in opposition to the direction of movement of said plate in response to acceleration forces applied to said mass.

8. In combination in a vehicular suspension having four wheels resiliently supported relative to a frame member, a fluid operated suspension strut positioned between each said wheel and said frame for carrying the load of said frame on a volume of compressible gas associated with each said strut, a source of fluid under pressure, valve means for alternatively supplying fluid from said source to expand each said strut or venting each said strut to atmosphere to contract the strut and lower said frame, first means responsive to the position of each said wheel relative to said frame to actuate the valve means to maintain the respective strut for each wheel at a predetermined degree of expansion, second means for actuating said valve means comprising a plate member positioned generally horizontally and universally pivoted relative to said frame and having a center of gravity vertically spaced from said pivot whereby acceleration forces on said frame will deflect said plate, means resiliently biasing said plate into a neutral position in which said valve means is closed, means responsive to the position of said plate for controlling said valve means to expand each said strut on the side of the vehicle toward which said center of gravity moves under the forces of acceleration applied to it.

9. In combination in a vehicular suspension having four wheels resiliently supported relative to a frame member, a fluid operated suspension strut positioned between each said wheel and said frame for carrying the load of said frame on a volume of compressible gas associated with each said strut, a source of fluid under pressure, valve means for alternatively supplying fluid from said source to expand each said strut or venting each said strut to atmosphere to contract the strut and lower said frame, first means responsive to the position of each said wheel relative to said frame to actuate the valve means to maintain the respective strut for each wheel at a predetermined degree of expansion, second means for actuating said valve means comprising a plate member positioned generally horizontally and universally pivoted relative to said frame and having a center of gravity vertically spaced from said pivot whereby acceleration forces on said frame will deflect said plate, means resiliently biasing said plate into a neutral position in which said valve means is closed, means responsive to the position of said plate for controlling said valve means to expand each said strut on the side of the vehicle toward which said center of gravity moves under the forces of acceleration applied to it, said last-named means comprising a conduit directing fluid under pressure to a fluid motor acting to effect expansion of its respective strut and a restrictive nozzle opening against said plate and progressively close upon deflection of said plate against said nozzle to build up pressure in said conduit.

10. In combination in a vehicular suspension having four wheels resiliently supported relative to a frame member, a fluid operated suspension strut positioned between each said wheel and said frame for carrying the load of said frame on a volume of compressible gas associated with each said strut, a source of fluid under pressure, valve means for alternatively supplying fluid from said source to expand each said strut or venting each said strut to atmosphere to contract the strut and lower said frame, first means responsive to the position of each said wheel relative to said frame to actuate the valve means to maintain the respective strut for each wheel at a predetermined degree of expansion, second means for actuating said valve means comprising a plate member positioned generally horizontally and universally pivoted relative to said frame and having a center of gravity vertically spaced from said pivot whereby acceleration forces on said frame will deflect said plate, means resiliently biasing said plate into a neutral position in which said valve means is closed, means responsive to the position of said plate for controlling said valve means to expand each said strut on the side of the vehicle toward which said center of gravity moves under the forces of acceleration applied to it, said last-named means comprising a conduit directing fluid under pressure to a fluid motor acting to effect expansion of its respective strut and a restrictive nozzle opening against said plate and progressively close upon deflection of said plate against said nozzle to build up pressure in said conduit, and feed-back means directing the fluid under pressure in each said strut against said plate at a point thereon adjacent the respective nozzle to bias the plate into said neutral position.

11. In combination in a vehicular suspension having four wheels resiliently supported relative to a frame member, a fluid operated suspension strut positioned between each said wheel and said frame for carrying the load of said frame on a volume of compressible gas associated with each said strut, a source of fluid under pressure, valve means for alternatively supplying fluid from said source to expand each said strut or venting each said strut to atmosphere to contract the strut and lower said frame, first means responsive to the position of each said wheel relative to said frame to actuate the valve means to maintain the respective strut for each wheel at a predetermined degree of expansion, second means for actuating said valve means comprising a plate member positioned generally horizontally and universally pivoted relative to said frame and having a center of gravity vertically spaced from said pivot whereby acceleration forces on said frame will deflect said plate, means resiliently biasing said plate into a neutral position in which said valve means is closed, means responsive to the position of said plate for controlling said valve means to expand each said strut on the side of the vehicle toward which said center of gravity moves under the forces of acceleration applied to it, said first means including a connection between said wheel and valve means and incorporating a mass movable generally vertically with said wheel and resiliently connected thereto to attenuate high frequency vibrations in said wheel before reaching the valve means.

References Cited in the file of this patent

UNITED STATES PATENTS

| | | |
|---|---|---|
| 2,593,040 | Lloyd | Apr. 15, 1952 |
| 2,778,656 | May | Jan. 22, 1957 |
| 2,792,235 | Federspiel | May 14, 1957 |
| 2,860,889 | Hanna | Nov. 18, 1958 |